United States Patent [19]

Nomura

[11] 4,134,657
[45] Jan. 16, 1979

[54] DEVICE FOR INDICATING THE ADVANCING OF FILM IN A CAMERA BEING TAKEN UP OR REWOUND

[75] Inventor: Katsuhiko Nomura, Kawagoe, Japan

[73] Assignee: Asahi Kogaku Kogyo Kabushiki Kaisha, Tokyo, Japan

[21] Appl. No.: 830,286

[22] Filed: Sep. 2, 1977

[30] Foreign Application Priority Data

Sep. 3, 1976 [JP] Japan .................. 51-118538[U]

[51] Int. Cl.² ............................................. G03B 1/00
[52] U.S. Cl. ................................. 354/212; 354/218; 354/289
[58] Field of Search ............... 354/201, 212, 215, 217, 354/218, 289

[56] References Cited

U.S. PATENT DOCUMENTS

| | | | |
|---|---|---|---|
| 1,680,647 | 8/1928 | Stark et al. .................... | 354/218 |
| 2,150,696 | 3/1939 | Nelson .......................... | 354/212 |
| 2,521,933 | 9/1950 | Mihalyi ......................... | 354/217 |
| 3,688,668 | 9/1972 | Ort ................................ | 354/212 |

*Primary Examiner*—Russell E. Adams
*Attorney, Agent, or Firm*—Sughrue, Rothwell, Mion, Zinn and Macpeak

[57] ABSTRACT

A camera in which a roll of film is employed is provided with a device for indicating the advancing of film being taken up or rewound. A friction member is rotatably mounted on the film take-up spool shaft but does not rotate with the shaft unless film is wound around the friction member. The friction member is provided with a cam portion which is engaged by one end of an indication lever. The other end of the indication lever is provided with a striped or other pattern which is viewable through a window in the camera body. Alternatively, a portion of the friction member could be directly viewed through the window.

3 Claims, 2 Drawing Figures

DEVICE FOR INDICATING THE ADVANCING OF FILM IN A CAMERA BEING TAKEN UP OR REWOUND

BACKGROUND OF THE INVENTION

This invention relates to a device for indicating the advancing of a film taken up or rewound for a camera in which a roll of film is employed.

In the use of a camera in which a roll of film is employed, it is a common procedure for a roll of film to be set in a camera with its leading end inserted in a groove in a film take-up spool, and the film is then wound on the spool, frame by frame, after every exposure. In the event of the defective insertion of the leading end of the film in the spool, or should, in case of a 35 mm film, no perforation be provided in any tooth of a sprocket, the smooth feeding of a film might not occur. Notwithstanding, an operator of a camera, particularly a beginner, might continue photographing without being aware of the failure of the feed of the film, thus losing important pictures.

SUMMARY OF THE INVENTION

The present invention is therefore directed to preventing the trouble described and providing a device, wherein an operator can know from the exterior of a camera body, according to a signal, whether or not a roll of film is positively wound on a film take-up spool. It is another object of the present invention to provide a device for indicating the condition of a film taken up or rewound, wherein in case a roll of film is fed back, an operator of the camera can know the transfer of the film from a spool to a patrone or cassette, and when the end of the film has been completely released from the spool, the signal is stopped. As a result, the operator can known the completion of the rewinding of the film, thereby preventing the leading end of the film from being rewound into the patrone or cassette.

DETAILED DESCRIPTION OF THE INVENTION

Figure 1:
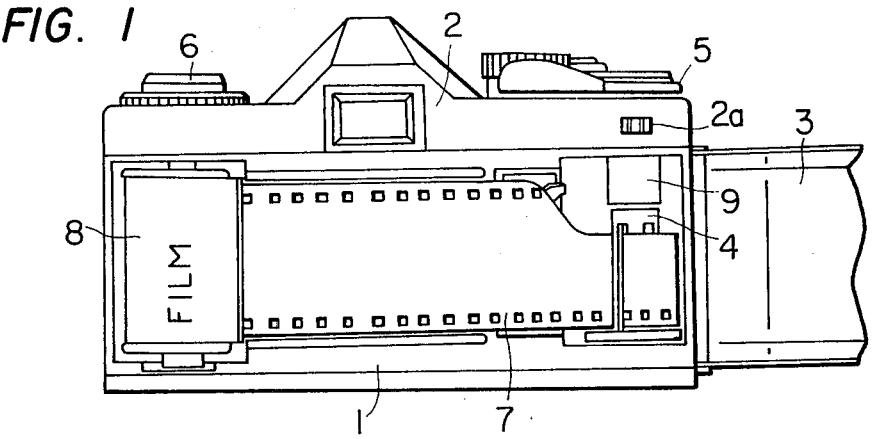
FIG. 1 is a rear view of a camera embodying the present invention.

A preferred embodiment of the present invention will now be described with reference to the accompanying drawings. Referring first to FIG. 1, a camera body 1 is provided with a top decorative plate 2 and a rear cover 3. A film-take-up spool 4 is rotated by a film winding lever 5 to advance the film 7. A film feedback knob 6 is provided to rewind the film 7 into a patrone or cassette 8. This figure shows the condition in which the roll of film is loaded in the camera body, with the leading end inserted in a groove in the film take-up spool 4, and the film is going to be wound on the spool 4.

Figure 2:
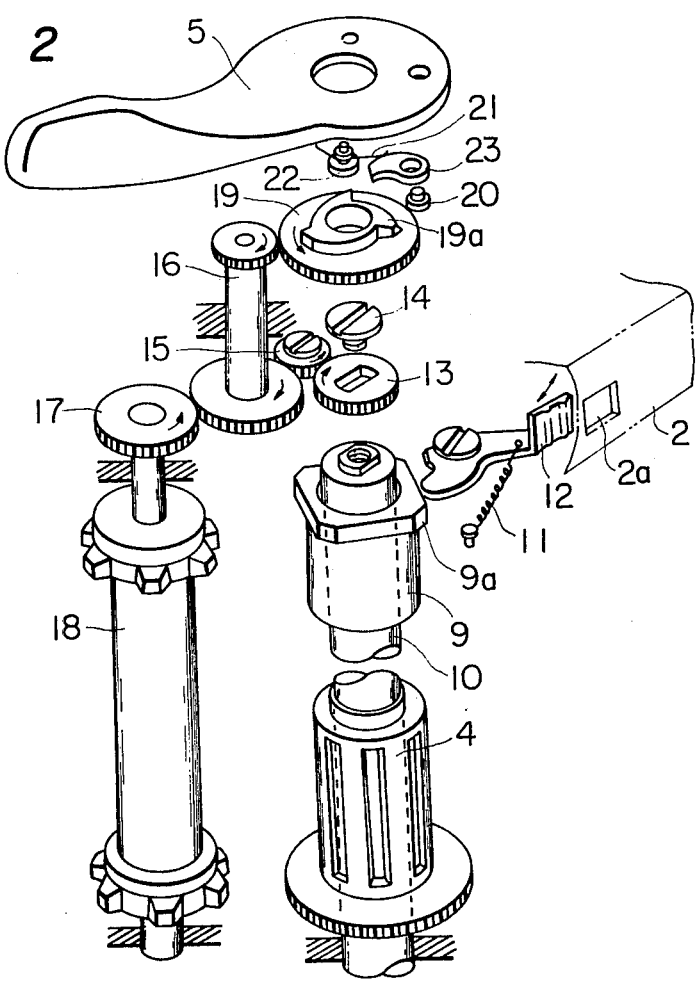
FIG. 2 is an exploded, perspective view of part of the camera of FIG. 1.

In FIG. 2, shown at 20 is a ratchet pawl shaft on which is pivotally mounted a ratchet pawl 22. A ratchet spring 21 mounted on a ratchet spring shaft 22 biases the ratchet pawl 23 into engagement with ratchet 19a. Both the ratchet pawl shaft 23 and the spring shaft are fixed to film winding lever 5. When film take-up lever 5 is turned, a ratchet pawl 23 and a ratchet 19a of a gear 19 are brought into engagement with each other, to thereby turn the ratchet in the direction of the arrow. A spool gear 13 attached to spool shaft 10 by screw 14 is rotated in the direction of the arrow by way of associated gears 16 and 15, thereby rotating the spool shaft 10. Film take-up spool 4 is frictionally coupled to spool shaft 10, and rotates integrally with spool shaft 10 unless a film is loaded. One of the associated gears 16 is in engaging relation to a sprocket gear 17, and a sprocket 18 is rotated in the direction of the arrow to thereby feed the roll of film to spool 4, whereby the film is taken up on spool 4. A friction member 9 is loosely fitted on spool shaft 10 and has a cam-shaped portion 9a, to which the one end of an indication lever 12 is maintained in contacting relation under the action of a spring 11. The other end of indication lever 12 is arranged internally of a window 2a in top decorative plate 2, and given, for example, a stripe pattern, so that the movement of indication lever 12 may be viewed with ease from the exterior of the camera body. If film winding lever 5 is turned in the film-winding direction, film take-up spool 4 and spool shaft 10 are rotated, but friction member 9 remains still, because same is loosely fitted on spool shaft 10. Accordingly, indication lever 12 remains immovable. If a roll of film is loaded in the camera body with its leading end inserted in a groove in film take-up spool 4, and the film winding operation is effected, then the width-reduced portion (leader portion) of the roll of film will be wound on film take-up spool 4, as seen in FIG. 1, and then the full width portion of the film will be wound to the spool, and hence to friction member 9, with the result that friction member 9 will start rotating intergrally with film take-up spool 4. The rotation of cam portion 9a of friction member 9 causes the swinging motion of indication lever 12 contacting therewith in the direction of the arrow, so that an operator can know through the window 2a in top decorative plate 2 that the film is positively wound on film take-up spool 4. In feeding back the film to the patrone or cassette, when the film 7 has been completely released from friction member 9, indication lever 12 will no longer swing, whereby an operator can know the completion of the rewinding of the film.

The device according to the present invention is simple in construction, and enables an operator to know from the exterior of the camera body whether or not a film is taken up or rewound. It is possible to further simplify the device by eliminating the indication lever 12 and making a portion of the friction member 9, such as the cam portion 9a, directly viewably through the window 2a.

What is claimed is:

1. In a camera employing a roll of film and having a film take-up spool mounted on a spool shaft, a device for indicating the advancing of the film being taken up or rewound comprising:

a friction member rotatably mounted on said spool shaft, said friction member rotating with said spool shaft only when film is wound around said friction member, and means viewable from the outside of the camera for indicating the rotation of said friction member.

2. The indicating device as recited in claim 1 wherein said friction member is provided with a cam and said indicating means includes an indication lever one end of which engages said cam and the other end of which is viewable through a window in the camera body.

3. The indicating device as recited in claim 1 wherein said indicating means is a portion of said friction member directly viewable through a window in the camera body.

* * * * *